L. B. FISHER.
Sheep Shears.
No. 14,354.
Patented March 4, 1856.
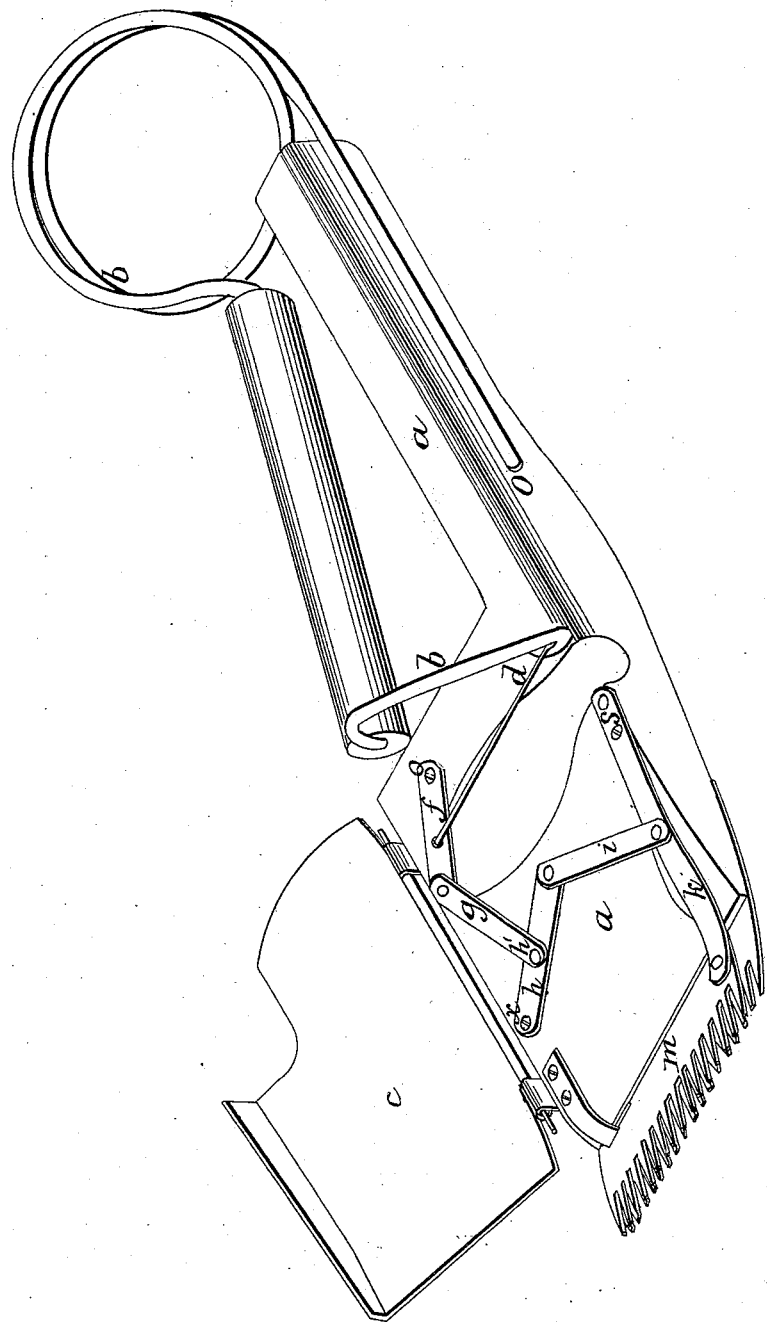

UNITED STATES PATENT OFFICE.

LUTHER B. FISHER, OF COLDWATER, MICHIGAN.

SHEEP-SHEARS.

Specification of Letters Patent No. 14,354, dated March 4, 1856.

*To all whom it may concern:*

Be it known that I, LUTHER B. FISHER, of the town of Coldwater, in the county of Branch and State of Michigan, have invented a new and useful Machine for Shearing Sheep and other Purposes; and I do hereby declare that the following is a full and exact description thereof, reference being had to the accompanying drawings, and to the letters of reference marked thereon, and which represent a perspective view of the shears complete.

The nature of my improvement consists in a series of bars or braces made of strips of metal and so constructed and arranged and combined with a spring which comes within the grasp of the hand as to increase the motion four fold doing away with the necessity and expense of complex gearing.

To enable others skilled in the art to make and use my invention I will proceed to describe its construction and operation.

(*a*) block of wood, or may be of metal, to which the movable parts of the apparatus are attached; (*c*) a lid hinged to one side of block (*a*) and is thrown open to show the internal arrangement as seen from the drawings; (*b*) a spring; (*d*) a rod one end secured loosely to spring; (*b*) the other end secured near the end of bar (*f*); one end of bar (*f*) is loosely fastened to block (*a*) at (*o*); (*g*) a bar loosely attached by a rivet at one end to bar (*f*); the other end is secured in the same manner near the end of bar (*h*) at (*h'*); bar *h* is loosely secured to block (*a*) at (*x*). The other end is secured to bar (*i*) by a rivet. The other end of bar (*i*) is riveted to bar (*k*) near the center; bar (*k*) is secured at one end to block (*a*) at (*s*), the other end is loosely fastened to cutters (*m*). These cutters may be made in sections, similar to those used for reaping and mowing machines or they may be cut out of plated steel underneath cutters (*m*) may be stationary cutters similar to those above or they may be in sections in any of the known ways.

This machine is operated by hand in the same manner that the common sheap shears are by clasping spring (*b*) with one hand. When said spring is pressed together it will be seen by the connection through rod (*d*) that bars (*f*, *g*, *h*, and *i*) are moved and through them the cutters (*m*) are rapidly vibrated past the stationary cutters underneath them. This simple arrangement causes bar (*k*) to make four vibrations to spring (*b*) one. As the cutters cut both ways they make eight cuts to each pressure of the hand. I attach bar (*d*) and bar (*g*) to one side of the center connection of bars (*f*) (*g*) (*h*) and (*i*) for the purpose of decreasing the motion of spring (*b*) and increasing the motion of cutters (*m*).

Although these shears are described for shearing sheep, they may be used as shears generally, for trimming hedges, flowers, lawn, or margins of flower beds, or for any other purpose to which shears are applicable; and the vibrations of the cutters may be increased or dimished by increasing or diminishing the number of levers used.

Having thus fully described the nature of my invention, I would state that, I am aware a sheep shearing machine has been devised in which, a combination of racks, pinions, pawls, spur wheels, crank pulleys &c. are used for vibrating the cutters. This machine is too complicated to be useful, and requires both hands to operate it. I do not therefore lay any claims to such a machine; but

What I do claim as new and desire to secure by Letters Patent is—

The so constructing of the shears, as that the mere clasping of the hand, or operating of the fingers, in which the shears are held and controlled, shall produce a multiplied motion of the cutters, and this I claim whether said multiplied motion be produced through the jointed levers herein described, or their equivalents.

LUTHER B. FISHER.

Witnesses:
A. H. BURDICK,
F. T. EDDY.